US010353888B1

(12) United States Patent
Cogan et al.

(10) Patent No.: US 10,353,888 B1
(45) Date of Patent: Jul. 16, 2019

(54) EVENT PROCESSING SYSTEM, METHOD, AND COMPUTER PROGRAM

(71) Applicant: Amdocs Development Limited, Limassol (CY)

(72) Inventors: Peter John Cogan, Dublin (IE); Paul Andrew Ferguson, Dublin (IE); Catherine Boothman, Dublin (IE); Tomasz Rutowski, Gdansk (PL)

(73) Assignee: AMDOCS DEVELOPMENT LIMITED, Limassol (CY)

( * ) Notice: Subject to any disclaimer, the term of this patent is extended or adjusted under 35 U.S.C. 154(b) by 429 days.

(21) Appl. No.: 15/060,511

(22) Filed: Mar. 3, 2016

(51) Int. Cl.
G06F 16/00 (2019.01)
G06F 16/23 (2019.01)
G06F 16/2453 (2019.01)

(52) U.S. Cl.
CPC ...... *G06F 16/2365* (2019.01); *G06F 16/2453* (2019.01)

(58) Field of Classification Search
None
See application file for complete search history.

(56) References Cited

U.S. PATENT DOCUMENTS

| | | | |
|---|---|---|---|
| 6,014,647 A | 1/2000 | Nizzari et al. |
| 6,026,398 A | 2/2000 | Brown et al. |
| 6,317,700 B1 | 11/2001 | Bagne |
| 6,321,206 B1 | 11/2001 | Honarvar |
| 6,996,551 B2 | 2/2006 | Hellerstein et al. |
| 7,672,865 B2 | 3/2010 | Kumar et al. |
| 7,702,615 B1 | 4/2010 | Delurgio et al. |
| 7,720,759 B2 | 5/2010 | Fine et al. |
| 7,730,003 B2 | 6/2010 | Pinto et al. |
| 7,865,383 B2 | 1/2011 | Tafoya |
| 7,917,383 B2 | 3/2011 | Maga et al. |
| 8,103,531 B2 | 1/2012 | Wollan et al. |
| 8,140,362 B2 | 3/2012 | Deshpande et al. |
| 8,165,920 B2 | 4/2012 | Goel |
| 8,204,884 B2 | 6/2012 | Freedman et al. |

(Continued)

FOREIGN PATENT DOCUMENTS

WO 2011079200 A2 6/2011
WO 2013043672 A1 3/2013

OTHER PUBLICATIONS

"IBM Journey Analytics," IBM Commerce, Dec. 2015, pp. 1-4, retrieved from https://www.ibm.com/blogs/commerce/articles/tag/ibm-journey-analytics/.

(Continued)

*Primary Examiner* — Bai D Vu
(74) *Attorney, Agent, or Firm* — Zilka-Kotab, P.C.

(57) ABSTRACT

An event processing system, method, and computer program product are provided. A plurality of records are stored, including a plurality of events of different event types for a plurality of customers. In use, an indication is received in connection with one or more aspects associated with one or more of the events for one or more of the customers. Based on such indication, one or more subsets of the events of one or more of the records are identified. In some optional embodiments, such one or more event subsets are then processed to reduce noise therein, resulting in fewer events in the one or more event subsets. To this end, a result of the processing may be displayed in a variety of ways for a variety of purposes.

11 Claims, 13 Drawing Sheets

(56) References Cited

U.S. PATENT DOCUMENTS

| | | | |
|---|---|---|---|
| 8,311,863 | B1 | 11/2012 | Kemp |
| 8,335,692 | B2 | 12/2012 | Sheth et al. |
| 8,504,408 | B2 | 8/2013 | Banthia et al. |
| 8,543,690 | B1 | 9/2013 | Zeitoun et al. |
| 8,560,359 | B2 | 10/2013 | Salle et al. |
| 8,600,804 | B2 | 12/2013 | Ramchandani et al. |
| 8,976,955 | B2 | 3/2015 | Liberman Ben-Ami et al. |
| 9,098,810 | B1 | 8/2015 | Sengupta et al. |
| 9,836,760 | B2 * | 12/2017 | Greenzeiger ...... G06Q 30/0244 |
| 10,067,990 | B1 | 9/2018 | Boothman et al. |
| 10,140,345 | B1 | 11/2018 | Lereford et al. |
| 2003/0046130 | A1 | 3/2003 | Golightly et al. |
| 2003/0084075 | A1 * | 5/2003 | Balogh ............. G06F 9/505 |
| 2005/0091156 | A1 | 4/2005 | Hailwood et al. |
| 2006/0282298 | A1 | 12/2006 | Azvine et al. |
| 2007/0112614 | A1 | 5/2007 | Maga et al. |
| 2008/0040364 | A1 | 2/2008 | Li |
| 2009/0018996 | A1 | 1/2009 | Hunt et al. |
| 2011/0082712 | A1 | 4/2011 | Eberhardt, III et al. |
| 2011/0137853 | A1 * | 6/2011 | Mackay ............. G06Q 10/06 706/57 |
| 2011/0179067 | A1 | 7/2011 | Dalvi et al. |
| 2012/0130771 | A1 | 5/2012 | Kannan et al. |
| 2012/0158485 | A1 | 6/2012 | Ogawa |
| 2013/0080362 | A1 | 3/2013 | Chang et al. |
| 2013/0244744 | A1 | 9/2013 | Fonss et al. |
| 2013/0282430 | A1 | 10/2013 | Kannan et al. |
| 2013/0317886 | A1 | 11/2013 | Kiran et al. |
| 2014/0052503 | A1 | 2/2014 | Zaloom |
| 2014/0156681 | A1 | 6/2014 | Lee et al. |
| 2014/0207561 | A1 | 7/2014 | Dandekar et al. |
| 2014/0222538 | A1 | 8/2014 | Merrifield, Jr. et al. |
| 2014/0229164 | A1 | 8/2014 | Martens et al. |
| 2015/0032746 | A1 * | 1/2015 | Lev-Tov ............. G06F 16/243 707/737 |
| 2015/0074597 | A1 * | 3/2015 | Etuaho ............. G06F 3/04883 715/800 |
| 2015/0128263 | A1 | 5/2015 | Raugas et al. |
| 2015/0161508 | A1 | 6/2015 | Martinez et al. |
| 2015/0178371 | A1 | 6/2015 | Seth et al. |
| 2015/0193699 | A1 | 7/2015 | Kil et al. |
| 2015/0244580 | A1 | 8/2015 | Saavedra |
| 2016/0012280 | A1 | 1/2016 | Ito et al. |
| 2016/0352900 | A1 | 12/2016 | Bell et al. |
| 2017/0024640 | A1 | 1/2017 | Deng et al. |
| 2017/0245106 | A1 | 8/2017 | Connelly et al. |

OTHER PUBLICATIONS

Rittman, S., "Visualizing the customer journey through analytics," May 1, 2015, pp. 1-2, retrieved http://blogs.sas.com/content/hls/2015/05/01/visualizing-the-customer-journey-through-analytics.

"Customer Engagement Analytics," NICE Systems, pp. 1-5, retrieved on Jan. 25, 2016 from http://www.nice.com/engage/customer-engagement-analytics.

Rabiner, L. R., "A tutorial on hidden Markov models and selected applications in speech recognition," Proceedings of the IEEE, vol. 77, No. 2, Feb. 1989, pp. 257-286.

Heineman, G. T. et al., "Algorithms in a Nutshell; A Desktop Quick Reference" First Edition, 2009, pp. 1-336.

Buttle, F., "Customer Relationship Management: Concepts and Technologies," Second Edition, Butterworth-Heinemann, 2009, pp. 1-500.

Brugnoli, G., "Connecting the Dots of User Experience—The design of an interaction system: a tool to analyze and design the user experience," Journal of Information Architecture, vol. 1, Issue 1, 2009, pp. 6-15.

Richardson, A., "Innovation X: Why a Company's Toughest Problems are it's Greatest Advantage," Jossey-Bass, Wiley, 2010, ebook, pp. 1-264.

Mangiaracina, R. et al., "The eCommerce Customer Journey: A Model to Assess and Compare the User Experience of the eCommerce Websites," Journal of Internet Banking and Commerce, vol. 14, No. 3, Dec. 2009, pp. 1-11.

Cogan, P. J. et al., U.S. Appl. No. 14/453,500, filed Aug. 6, 2014.

Lavalle, S. et al., "Big Data, Analytics and the Path From Insights to Value," MIT Sloan Management Review, vol. 52, No. 2, Winter 2011, pp. 21-31.

Heineman, G. T. et al., "Algorithms in a Nutshell; A Desktop Quick Reference" First Edition, 2009, Chapter 7, pp. 172-225.

Cogan, P. J. et al., U.S. Appl. No. 15/060,538, filed Mar. 3, 2016.

Hereford et al., U.S. Appl. No. 15/060,517, filed Mar. 3, 2016.

Non-Final Office Action from U.S. Appl. No. 15/060,517, dated May 17, 2018.

Wikipedia, "Mean" Wikipedia, last updated May 11, 2018, 7 pages, retrieved from en.wikipedia.org/wiki/Mean.

Wikipedia, "Covariance," Wikipedia, last updated Apr. 6, 2018, 7 pages, retrieved from en.wikipedia.org/wiki/Covariance.

Boothman et al., U.S. Appl. No. 15/060,520, filed Mar. 3, 2016.

Non-Final Office Action from U.S. Appl. No. 15/060,520, dated Mar. 8, 2018.

Hamuro et al., "A Machine Learning Algorithm for Analyzing String Patterns Helps to Discover Simple and Interpretable Business Rules from Purchase History," Progress in Discovery Science 2001, LNAI 2281, 2002, pp. 565-575.

Notice of Allowance from U.S. Appl. No. 15/060,520, dated Jul. 17, 2018.

Loucks et al., "Chapter 9: Model Sensitivity and Uncertainty Analysis," Water Resources Systems Planning and Management: An Introduction to Methods, Models and Applications, UNESCO Publishing, 2005, 38 pages.

Notice of Allowance from U.S. Appl. No. 15/060,517, dated Oct. 10, 2018.

First Action Interview Pilot Program Pre-Interview Communication from U.S. Appl. No. 15/060,538, dated Nov. 20, 2018.

* cited by examiner

EVENT PROCESSING SYSTEM, METHOD, AND COMPUTER PROGRAM

FIELD OF THE INVENTION

The present invention relates to customer data processing systems, and more particularly to processing customer data for analysis purposes.

BACKGROUND

A variety of customer data processing systems exist for tracking information on interactions a customer has with a business. During use, such customer data processing systems process the aforementioned information for a variety of analysis purposes. For example, some systems generate maps reflecting the aforementioned interactions based on various criteria. To date, such customer data processing systems lack an ability to focus on a particular area of interest and/or to allow more meaningful comparisons among a set of customers.

There is thus a need for addressing these and/or other issues associated with the prior art.

SUMMARY

An event processing system, method, and computer program product are provided. A plurality of records are stored, including a plurality of events of different event types for a plurality of customers. In use, an indication is received in connection with one or more aspects associated with one or more of the events for one or more of the customers. Based on such indication, one or more subsets of the events of one or more of the records are identified. In some optional embodiments, such one or more event subsets are then processed to reduce noise therein, resulting in fewer events in the one or more event subsets. To this end, a result of the processing may be displayed in a variety of ways for a variety of purposes.

DETAILED DESCRIPTION

Figure 1:
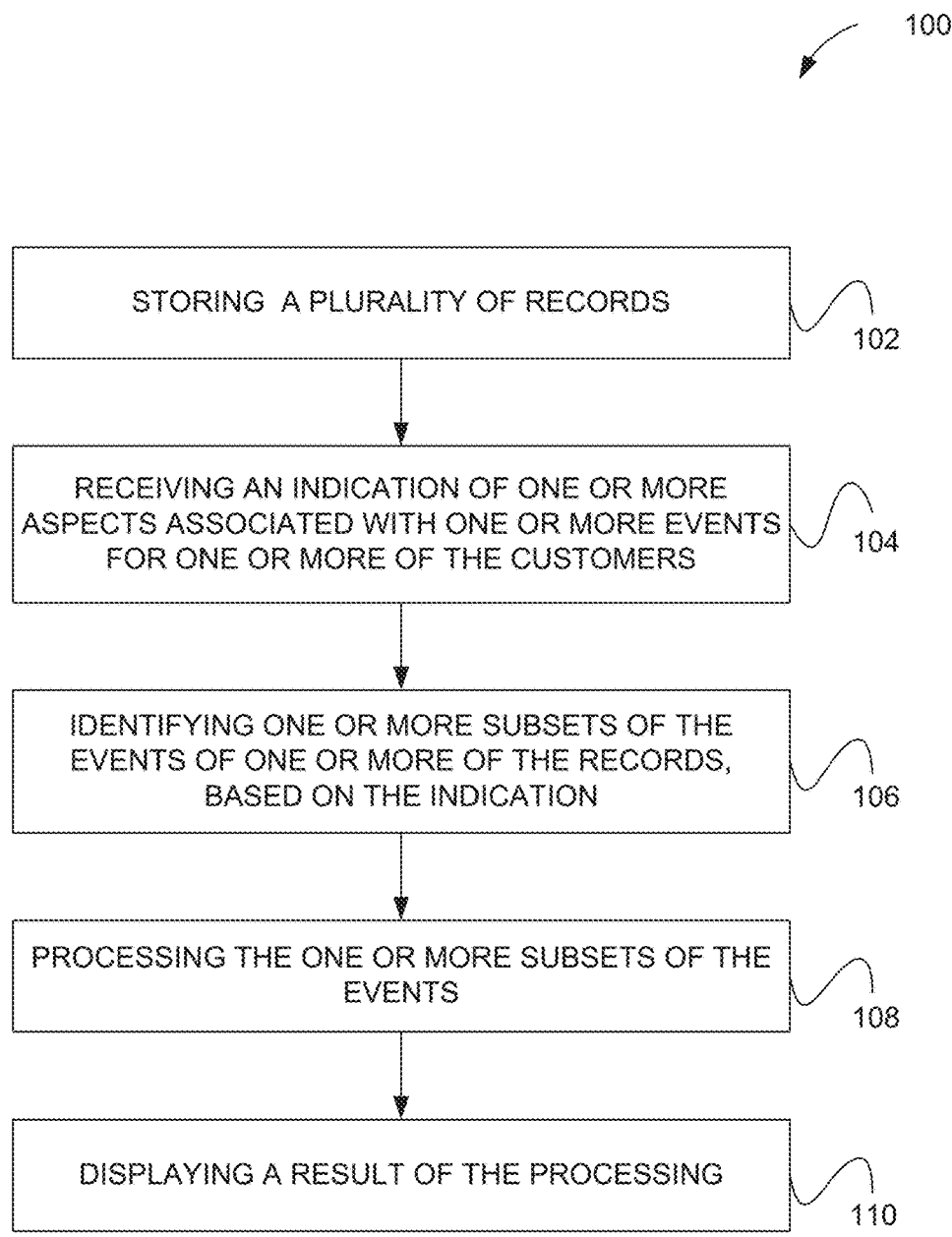
FIG. 1 illustrates a method for event processing, in accordance with one embodiment.

FIG. 1 illustrates a method 100 for event processing, in accordance with one embodiment. As indicated in operation 102, a plurality of records are stored. The records collectively include a plurality of events of different event types. Further, such events relate to a plurality of different customers. As an option, in one possible embodiment, the events may be collected from a plurality of different sources.

In the context of the present description, a record may refer to any one or more data structures that is capable of including one or more events. Also in the context of the present description, an event refers to any information relating to an event involving one or more of the aforementioned customers. Just by way of example, in one exemplary embodiment, each event may involve an off-line and/or on-line interaction with one or more of the aforementioned customers. Still yet, the types of the events may differ in any desired manner. For instance, in one possible embodiment, one or more events may relate to a call or message (or any other communication, for that matter) received from and/or sent to a particular customer, one or more events may relate to a purchase made by a particular customer, one or more events may relate to a return made by a particular customer, etc.

In one optional embodiment to be described in the context of subsequent figures, the aforementioned record may include a "journey record," or more simply just a "journey", of a customer. In the context of the present description, a journey record, or a journey, refers to any sequence of events over time in connection with at least one customer.

As indicated in operation 104, an indication is received in connection with one or more aspects associated with one or more events for one or more of the customers. In the context of the present description, such aspect(s) may include anything of interest in connection with the events. Just by way of example, in one embodiment, the indication of the aspect(s) includes an identification of the one or more events, information associated with the one or more events, or anything else, for that matter.

Based on such indication, one or more subsets of the events of one or more of the records is identified. See operation 106. In one possible embodiment, the event subset(s) may be identified by determining that the one or more subsets of the events are relevant to the aspect(s) that is the subject of the indication of operation 104. In another possible embodiment, the event subset(s) may be determined to be relevant to the indicated aspect(s) based on any desired criteria, including, but not limited to: a time criteria, an event type criteria, a predetermined event criteria, and/or a plurality of rules. Still yet, in the context of the optional embodiment where the records include journeys, the event subset(s) identified in operation 106 may possibly each include a "sub-journey record," or more simply just a "sub-journey."

As indicated in operation 108, the event subset(s) may then be processed. In one possible embodiment, such processing may reduce noise in the event subset(s), resulting in fewer events therein. In the context of the present description, the aforementioned noise may refer to any one or more events and/or any other contents of the record(s) that is removable for the purpose of improving subsequent operation(s). For example, in one embodiment, the processing may involve reducing a portion of the events that are unique, for furthering the aforementioned noise reduction. To this end, a result of the processing may be more effectively displayed (and possibly further utilized) in a variety of ways. See operation 110.

It should also be noted that the method 100 may be implemented utilizing various hardware, software, applications, user interfaces, etc., as dictated by the implementer. More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

For example, in various embodiments, the processing of operation 108 may further include identifying a particular number of events in the event subset(s) that are unique, along with a total number of events in the event subset(s). To this end, a ratio of the particular number to the total number, may be calculated and used to further the aforementioned noise reduction. For instance, the ratio may serve as a basis for reducing the particular number of the events in the event subset(s) that are unique.

Further, in still other embodiments to be hereinafter described, a transition matrix may be used for reducing the portion of the events of the event subset(s) that are unique. In such optional embodiment, a transition matrix may be generated that includes, for example, counts of transitions between events of the event subset(s). Still yet, such counts may be converted to probabilities that may, in turn, be compared to a threshold. To this end, at least a portion of the events may be deleted, based on the comparison.

Other optional optimizations may also be applied in the context of the aforementioned embodiment. For example, as will be hereinafter described, the processing may iterate the foregoing comparison utilizing a plurality of thresholds. Further, a ratio (e.g. the aforementioned ratio, etc.) may be calculated for each iteration, to generate a plurality of ratios for the plurality of thresholds. To this end, at least one of the plurality of thresholds may be selected based on a corresponding one of the ratios, such that the selected at least one threshold may be ultimately utilized for the comparison on which the aforementioned deleting is based.

Of course, even further embodiments are contemplated, as well. For instance, another optional embodiment to be hereinafter described may involve representing events of the event subset(s) via a tree. In such embodiment, a portion of the events of the event subset(s) may be deleted, utilizing the tree.

Figure 2:
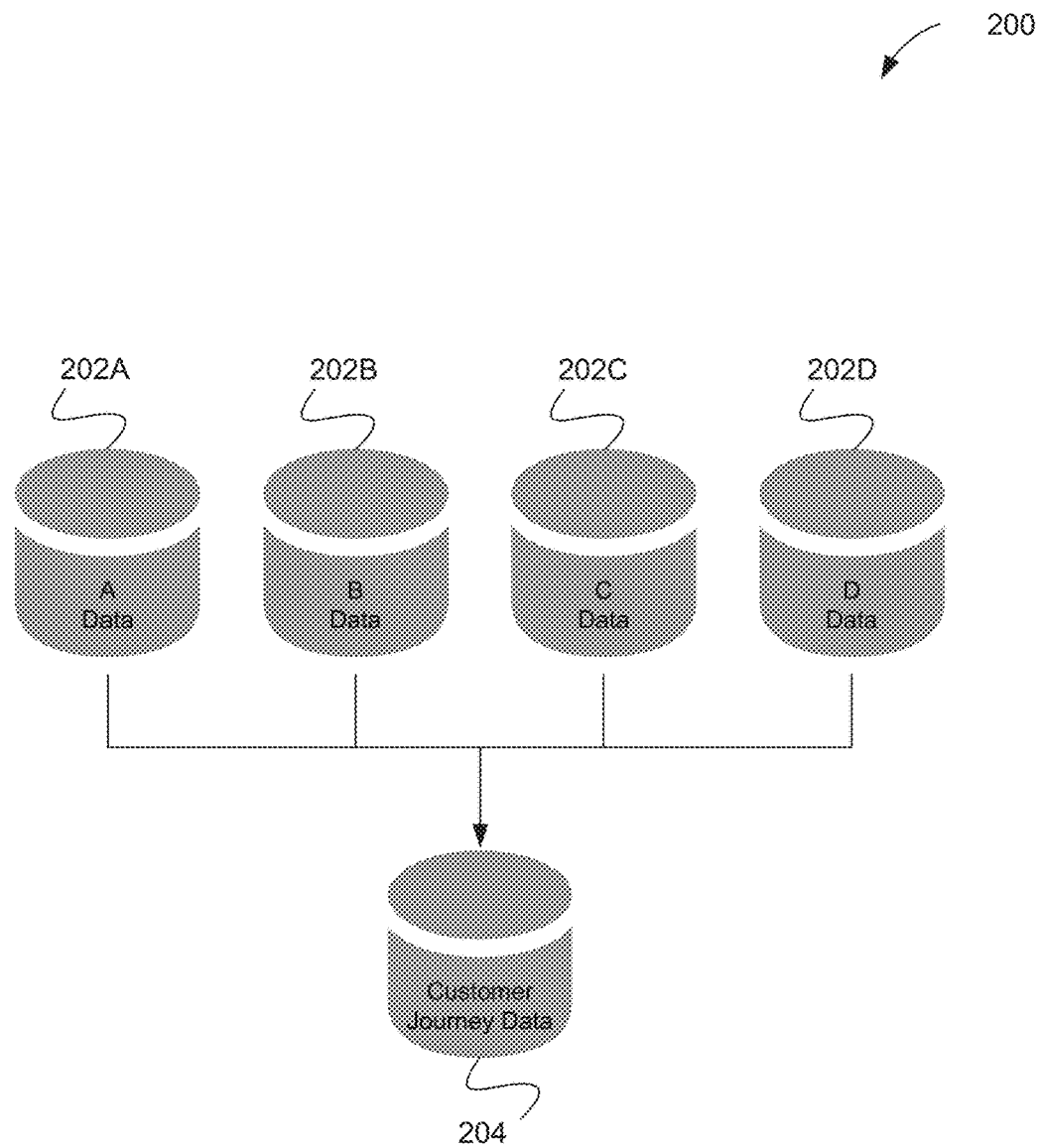
FIG. 2 illustrates a data collection system, in accordance with one embodiment.

FIG. 2 illustrates a data collection system 200, in accordance with one embodiment. As an option, the system 200 may be implemented in the context of the details of FIG. 1 and/or any subsequent figure(s). Of course, however, the system 200 may be implemented in the context of any desired environment. Further, the aforementioned definitions may equally apply to the description below.

In the context of the present embodiment illustrated in FIG. 2, a "journey" may relate to experiences of a customer through a set of interactions with a business. Such business may include any type of business including, but not limited to a service provider (e.g. network service provider, etc.), a provider of products, etc. As will become apparent, the customer journey may potentially hold valuable information related to different actions and paths that customers take to accomplish various goals.

It should be noted that a full customer journey potentially reflects the customer's interactions across a potentially extended period of time, during which the customer may have many different goals which they were attempting to accomplish. However, if one is interested in analyzing the customer's behavior in relation to accomplishing a specific goal, such larger segments of their full journey (which may be related to one or more different goals) may potentially be unrelated.

To this end, the present embodiment provides for the identification of more relevant sub-journeys. Such targeted sub-journeys may, in turn, provide a view of the actions taken in order to achieve a particular goal. Further, details within each sub-journey may provide the context necessary to understand the actions taken by a particular user to accomplish (or attempt to accomplish) a specific goal.

As will soon become apparent, extracting a large number of the foregoing sub-journeys for different users provides information helpful in differentiating between different user actions and making useful comparisons across users (and/or set(s) of users) in relation to the actions that are taken. In one possible embodiment, this sub-journey creation may be applied in analyzing the behavior of customers in relation to calling a call center. It may further allow for the comparison of factors that lead up to successful outcomes versus those that do not, across multiple users.

In terms of creating a single journey for each customer, data may be extracted relating to each of their events (e.g. touch points, etc.). Each of these events, in the present embodiment, may possibly capture an interaction between the customer and the business. Just by way of example, the events may involve a customer purchasing a product, a customer phoning a call center to resolve an issue, and/or any other interaction, for that matter.

In one embodiment, the different events may be stored across a number of sources (e.g. different database 202A, 202B, 202C, 202D) in a variety of different formats. As shown, data from the different database 202A, 202B, 202C, 202D may, in one embodiment, relate to different event types A, B, C, D. Thus, the creation of a single journey for each customer may initially involve extracting required information in a unified format for each customer into a single chronologically ordered list of events in at least one customer journey database 204.

Figure 3:
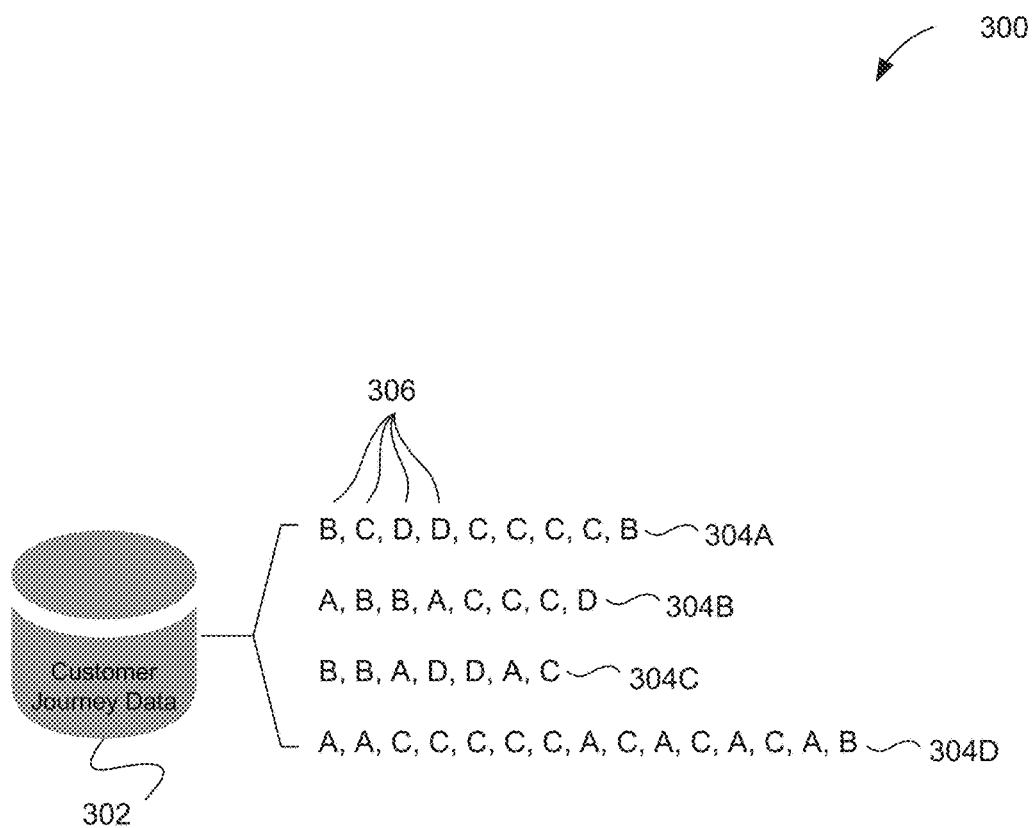
FIG. 3 illustrates a customer journey database system, in accordance with one embodiment.

FIG. 3 illustrates a customer journey database system 300, in accordance with one embodiment. As an option, the system 300 may be implemented in the context of the details of any previous and/or subsequent figure(s). For example, the system 300 may be implemented in the context of the customer journey database 204 of FIG. 2. Of course, however, the system 300 may be implemented in the context of any desired environment. Further, the aforementioned definitions may equally apply to the description below.

As shown in FIG. 3, a customer journey database 302 includes a plurality of journey records 304A, 304B, 304C, 304D each representing a customer journey (in chronological order, in the present embodiment). Further, each of the journey records 304A, 304B, 304C, 304D is illustrated to include a series of events 306 giving details of any interactions the customer had with various systems along the way. While each of the illustrated events 306 (A, B, C, etc.) represents a user interaction in the present embodiment, it should be noted that the information is not limited in this regard. For example, the events 306 may depend on the associated source and there may be potentially numerous different attributes which may be included that provide additional details relating to what precisely occurred during the corresponding event.

As mentioned earlier, the events 306 may involve a variety of different interactions (e.g. off-line, on-line, call, etc.) with one or more customers. In some embodiments, the attributes may exhibit a similar type of diversity. For example, the attributes may relate to a call, an on-line interaction, and/or an interaction in a brick and mortar store. To this end, the attributes may include an intent, a duration, a customer type, and/or an outcome. In other embodiments, the attributes may also exhibit a certain level of commonality. For instance, the attributes of the events 306 may be of a same number for each of the records, a same type for each of the records, and/or exhibit any other aspect of commonality for any desired purpose (e.g. to facilitate processing, etc.).

Figure 4:
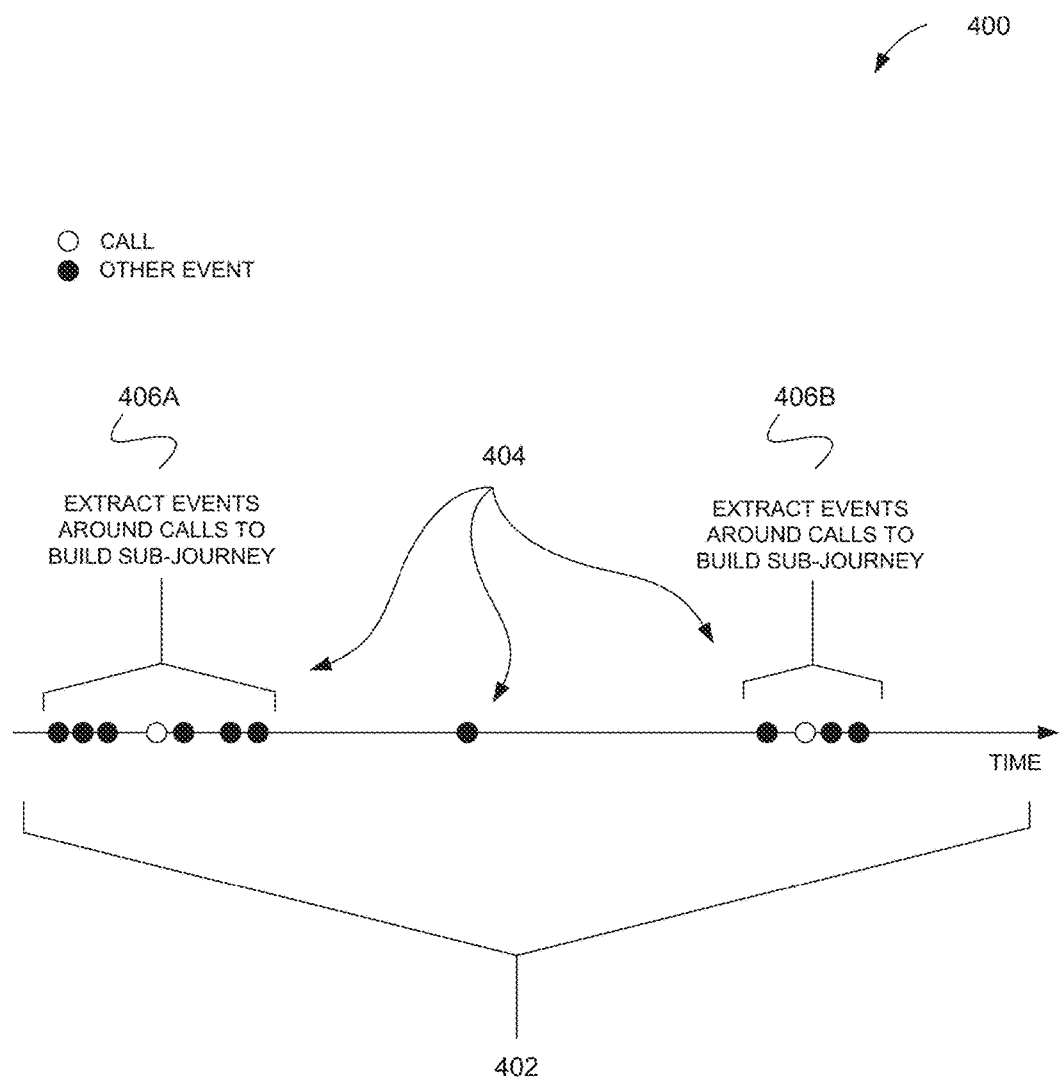
FIG. 4 illustrates a method for creating a targeted sub-journey, in accordance with one embodiment.

FIG. 4 illustrates a method 400 for creating a targeted sub-journey, in accordance with one embodiment. As an option, the method 400 may be implemented in the context of the details of any previous and/or subsequent figure(s). Of course, however, the method 400 may be implemented in the context of any desired environment. Further, the aforementioned definitions may equally apply to the description below.

As shown, a customer journey 402 is illustrated that includes an entire set of events 404 in which a user has been involved, across a potentially very long period of time, during which the customer may have had many different goals which they were attempting to accomplish. The method 400 serves to divide each entire journey 402 into sub-journeys 406A, 406B for creating "aspect"-centric sub-journeys, which provide a view of the actions relevant to the particular aspect. In the present embodiment, the aforementioned aspect may be a particular event (e.g. customer call, etc.) and/or a goal that the customer was attempting to accomplish.

For example, if a customer calls a call center and then calls again in one years' time, it cannot be assumed that the two calls are linked and, in fact, to get a better measure for the customer's experience in interacting with the call center, it may be potentially advantageous (in some embodiments) to look at each call in isolation. For example, isolating the relevant sub-journey 406A, 406B may allow one to look at the context for the call and then examine the customer experience afterwards to see if the issue was resolved. In this example, the user's goal may be to resolve an issue and the event-centric sub-journey that is created may be built around the relevant call.

As shown in FIG. 4, two distinct sub-journeys 406A, 406B are shown to be created, each of which captures the event of interest (e.g. the call, etc.), as well as other events that surround such event. By examining these sub-journeys 406A, 406B individually, factors may be more easily determined that lead to the respective call. It may also be possible to investigate if (and how quickly) the issue was resolved.

In one possible embodiment, the creation of the sub-journeys 406A, 406B may firstly require that an event of interest be specified (e.g. a phone call, etc.). It is also possible that an event of interest may be a sequence of events, or an event where something specific occurred. For instance, such specific occurrence may involve a customer having made a call but their call being transferred, etc. Once this event of interest is defined, a set of other "relevant" events may be extracted. In this sense, the sub-journey may be "targeted" towards the particular event. Depending on the event of interest, relevant events may occur before and/or after such event of interest.

In another possible embodiment, both this, as well as the manner in which relevant events are determined, may be configured. For instance, this may be accomplished based on time. Specifically, the method 400 may only include events for N number of days before and/or after a call. This potentially provides a set of sub-journeys related to a particular event of interest (or sequence of events), including the contextual events that occurred around such event. Each of the sub-journeys 406A, 406B may also be enriched with information relating to a customer profile. For example, various information (e.g. age, demographics, location, etc.) may be provided which may, in turn, account for certain behaviors.

To this end, various embodiments are operable to (but may not necessarily) provide a much more concise set of user interactions that can be used to determine how each customer acts around a particular point of interest. For instance, if a customer calls a call center, a precise sub-journey may be extracted showing the events that lead to such call, including potential issues like an incorrect bill being issued, and/or problems with a device they are using. Any additional events following the call may show an effect that the call had on the customer (e.g. if they had to call again to resolve the same issue, etc.).

Figure 5:
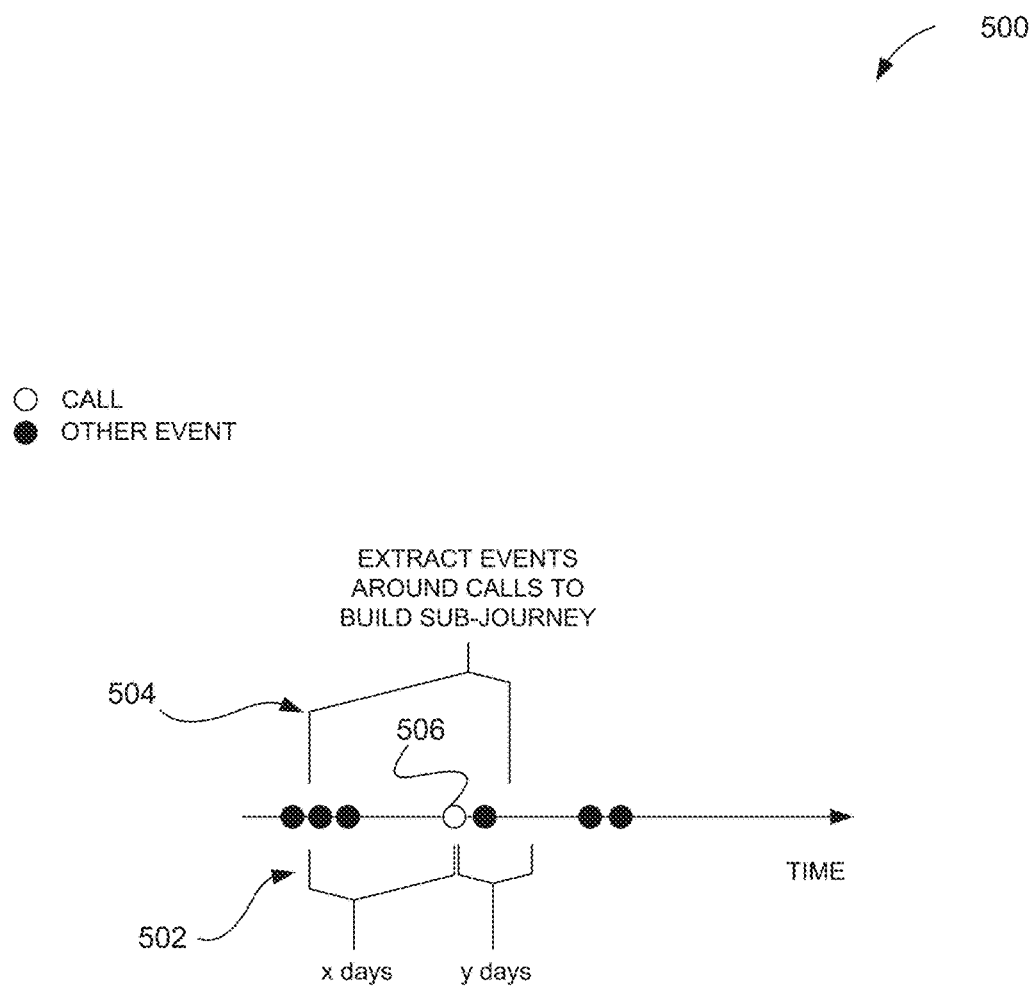
FIG. 5 illustrates a method for creating a targeted sub-journey, in accordance with one embodiment.

FIG. 5 illustrates a method 500 for creating a targeted sub-journey, in accordance with one embodiment. As an option, the method 500 may be implemented in the context of the details of any previous and/or subsequent figure(s). Of course, however, the method 500 may be implemented in the context of any desired environment. Further, the aforementioned definitions may equally apply to the description below.

In various embodiments, relevant events within each sub-journey may be determined in a number of different ways. In one possible embodiment, the specific way may be particular to a type of analysis that is required, based on the extracted sub-journeys. As illustrated in FIG. 5, for instance, certain relevant events 502 within a particular sub-journey 504 may be determined based on their proximity to an event of interest 506. Such proximity may, for instance, be determined as a function of time, or by falling within a specified number of events, etc. In one embodiment, it may also be determined that the relevant events are only of one particular type (and others are possibly not considered).

Alternatively or additionally, a starting point of the targeted sub-journey 504 may be signaled by a known event. For example, such known event may involve logging onto a website. By this design, known events may be designed to delimit start and end points of the sub-journey 504. Essentially, such relevance criteria may be determined by a number of factors, based on a need of those carrying out the end analysis, and the relevance criteria may even be specified as a set of rules to be followed in creating the desired sub-journey 504.

To this end, the extracted sub-journey 504 may be used to examine user behavior relating to a particular event and/or action of interest. One possible benefit of such approach of generating the concise sub-journey 504 may be to allow comparisons to be made across a number of customers. By the sub-journey 504 being created in a manner that is related to an event of interest, more meaningful comparisons are enabled across customers. Further, by examining sub-journeys of a large number of customers around the same event of interest, one can potentially gain insight into common factors that lead to success and/or failure.

Additional information will now be set forth, in the context of additional optional embodiments, regarding various techniques for further reducing noise in the targeted sub-journeys. For instance, in one embodiment, a journey/sub-journey database (e.g. see database 204/302 of FIGS. 2/3, etc.) may be utilized to generate two metrics, namely a total number of sub-journeys, and a number of unique sub-journeys. The number of unique sub-journeys may be useful, since customers with a sub-journey in common may have had a similar experience and thus represent a common use case. For example, a database of sub-journeys shown in Table 1 may be considered, where the letters represent events.

TABLE 1

A,B,C
A,D,C
A,B,C
E,F,G,
A,D,C

The database of Table 1 is shown to have a total of five (5) sub-journeys, and three (3) unique sub-journeys. With this, a metric R may be defined to be a ratio of the number of unique sub-journeys to the total number of sub-journeys. See Equation #1.

$$R = \frac{\text{Number of Unique Sub Journeys}}{\text{Number of Sub Journeys}} \qquad \text{Equation \#1}$$

where R is in the range $0 < R \leq 1$

In the aforementioned example illustrated in Table 1, R is 0.6. In one embodiment, R may be designed to be as low as possible. For instance, if every sub-journey is unique, then R is 1.

In the end, each unique sub-journey effectively represents a unique business case to be addressed. If there are too many unique sub-journeys, one may have too many business cases, and each business case has a very low number of instances (thus diluting and/or invalidating their value). For example, the set of sub-journeys of Table 2 may be considered, where the underlined events emphasize unique transitions.

TABLE 2

Journey 1—A,X,B,C,D,E,F
Journey 2—A,B,Y,C,D,X,E,F
Journey 3—A,D,B,C,D,E,F
Journey 4—A,B,Z,C,D,Y,E,F
Journey 5—A,B,C,D,L,E,F In this case, the ratio R is 1 as all sub-journeys are unique. In such case, it may be desired to reduce a noisiness associated with the sub-journeys, by, for example, removing rare event transitions. As exemplified in Table 2, it is quite likely that certain sub-journeys may have very unique sequences inside the sub-journey. This means that there may be existing commonalities at the beginning and/or the end of a sub-journey, but somewhere in the middle, there may be an event that creates an unnecessary unique sub-journey. A technique will now be described which may be used, in some embodiments, in order to identify such events.

In one embodiment, the aforementioned technique may involve the creation of a transition matrix which counts of a number of times a particular event j follows another event i. Thereafter, such counts in the transition matrix may be converted into probabilities. In one embodiment, this may be accomplished by dividing each cell by the sum of all transitions. Still yet, this may be iterated over each sub-journey. To this end, if the event transition in the sub-journey has a probability in the matrix below some threshold T1, such event (e.g. the second event in the transition, etc.) may be deleted.

An example of the foregoing technique will now be described in the context of a journey database illustrated by Table 3.

TABLE 3

Figure 6:
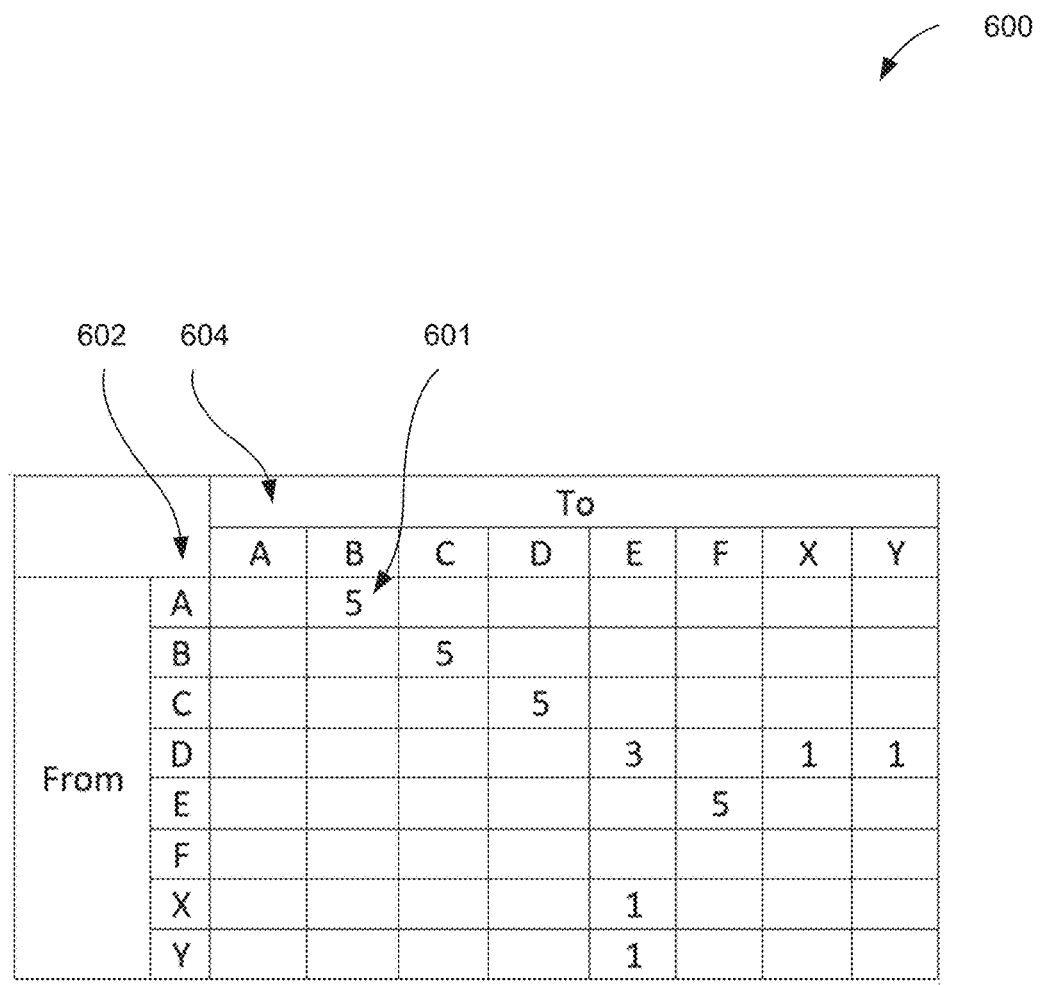
FIG. 6 illustrates a transition matrix for creating a targeted sub-journey, in accordance with one embodiment.
Figure 7:
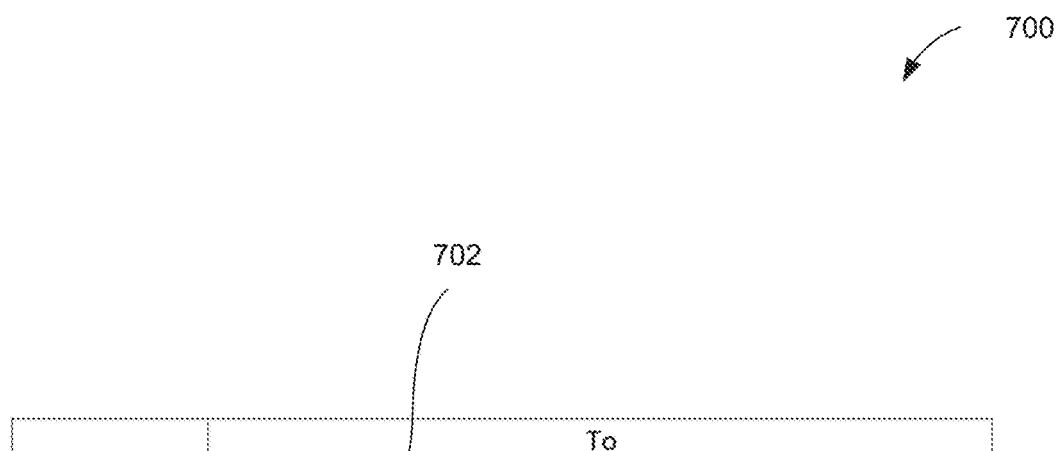
FIG. 7 illustrates a probability matrix for creating a targeted sub-journey, in accordance with one embodiment.

Journey 1—A,B,C,D,E,F
Journey 2—A,B,C,D,X,E,F
Journey 3—A,B,C,D,E,F
Journey 4—A,B,C,D,Y,E,F
Journey 5—A,B,C,D,E,F FIG. 6 illustrates a transition matrix 600 for creating a targeted sub-journey, in accordance with one embodiment. Specifically, the transition matrix 600 illustrates a count of transitions 601 from a first set of events 602 to a second set of events 604. As shown, a sum of all transitions is twenty-seven (27). FIG. 7 illustrates a probability matrix 700 for creating a targeted sub-journey, in accordance with one embodiment. As shown, the count of transitions 601 of FIG. 6 are converted to probabilities 702 in FIG. 7.

Next, a threshold may be applied and certain events involved in transitions may be deleted. In the context of the present example, a threshold T1 of 0.1 may be considered. In such embodiment, the transition probabilities 702 in FIG. 7 may be compared to the threshold T1, and the bracketed events illustrated in Table 4 may be deleted, since they are less than the threshold T1.

TABLE 4

Journey 1—A,B,C,D,E,F
Journey 2—A,B,C,D,[[X]],E,F
Journey 3—A,B,C,D,E,F
Journey 4—A,B,C,D,[[Y]],E,F
Journey 5—A,B,C,D,E,F As shown, as the technique is iterated over the original sub-journey database of Table 3, Journey 1 remains unchanged since all of the transitions exceed the threshold. As to Journey 2, it contains a transition D,X, which at probability 0.04, is below the threshold T1 (0.1). Thus, such transition is deleted, by removing the second event X, from the sub-journey, Journey 2, thus leaving "A,B,C,D,E,F." It can now be noted that Journey 2 is now identical to Journey 1, and thus the number of unique sub-journeys (and ratio R) have been reduced accordingly. As the technique iterates through each sub-journey, it can be seen that Journey 3 and Journey 5 remain unchanged, whereas Journey 4 has the transition D,Y removed, by deleting the event Y. To this end, all the sub-journeys are identical rendering R=0.2 (for the T1=0.1).

An additional embodiment will now be described for providing a technique that optimizes the removal of noisy transitions. This may, for example, be accomplished by optimizing the manner in which threshold T1 is set. As illustrated above, there is an inverse relationship between the threshold T1 and the ratio R, i.e. as T1 increases, R decreases. Since the events being removed from the sub-journey are a form of noise, one can expect a non-linear relationship to occur between the threshold T1 and the ratio R. In one embodiment, such non-linear effect may take the form of an 'elbow' in the relationship between the threshold T1 and the ratio R.

Figure 8:
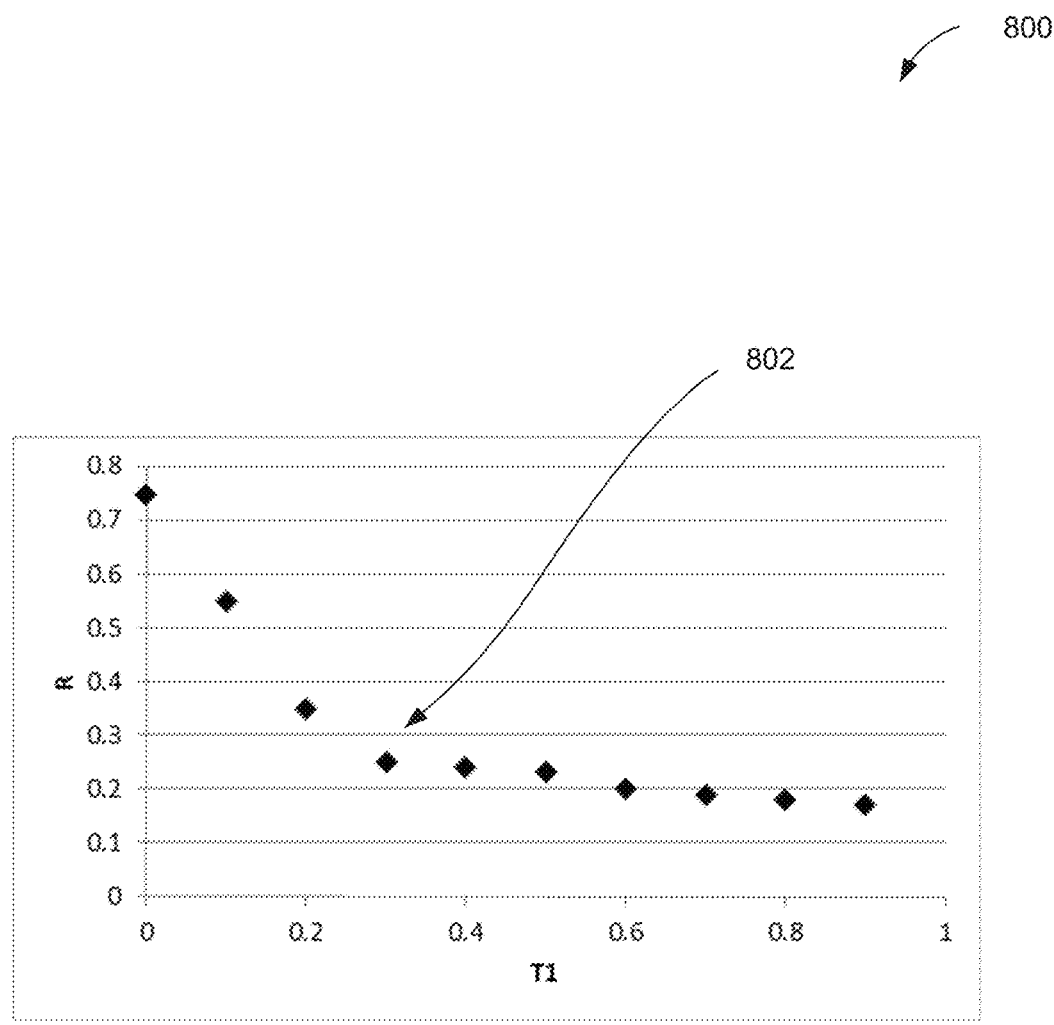
FIG. 8 illustrates a graph showing an example of an "elbow," in accordance with one embodiment.

FIG. 8 illustrates a graph 800 showing an example of an "elbow" 802, in accordance with one embodiment. As shown, such an elbow occurs when the threshold T1=0.3. By setting the threshold T1 to 0.3, a reduced value of the ratio R may be achieved, along with a database of sub-journeys which has a substantial reduction in noise.

In order to calculate a more optimal threshold T1 in accordance with one embodiment, a scan of all values of the threshold T1 may be conducted from 0 to 1 (with small increments). The resultant value of the ratio R from the sub-journey database may then be evaluated. Then, the elbow 802 of the plot of FIG. 8 can be used to select a more optimal value (in the present simple exemplary case, 0.3).

Yet another embodiment will now be described for representing collections of sub-journeys as a tree and further pruning rare branches. In one optional embodiment, the techniques described in U.S. patent application Ser. No. 14/453,500 filed Aug. 6, 2014, which is incorporated herein by reference for all purposes, may be utilized for representing a journey as a tree. Of course, however, such technique should not be construed as limiting in any manner, as any technique may be utilized for representing a journey as a tree (or set of trees).

Figure 9:
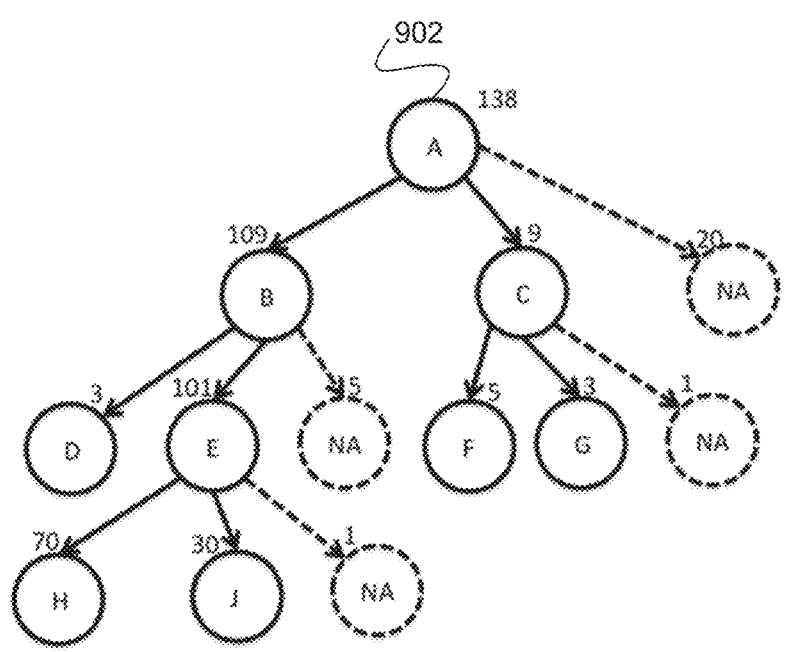
FIG. 9 illustrates a tree representing at least one journey, in accordance with one embodiment.

FIG. 9 illustrates a tree 900 representing at least one journey, in accordance with one embodiment. Using the tree representation, the sub-journeys may be simplified by removing noisy sequences of events (instead of or in addition to noisy transitions) and further reduce the ratio R. The tree 900 is shown to represent a sub-journey database of 183 sub-journeys and 9 unique sub-journeys, with the requirement that each sub-journey starts with event A.

It should be noted that such unifying event does not necessarily have to occur at a start of the tree 900, but is shown that way for simplification purposes. In order for the tree 900 to be constructed, an 'anchor' event 902 is provided through which all sub-journeys pass. In a business context, this may be some event which is of special importance to a use case. For example, if one is examining a set of events surrounding the payment of a bill, or a call to a call center, then they may want to set that event as the anchor event 902 and build the tree 900 around such event 902.

As shown, each node represents an event, and the nodes are labeled with a count of the number of times each sub-journey passes therethrough. For example, the sub-journey A,B,C occurs 3 times. Further, the sub-journey A,B,E,H occurs 70 times. Sub-journeys may also terminate at any given node, thus an imaginary node labeled 'NA' is added to represent such termination, with a count associated therewith. For example, the sub-journey A,B occurs 5 times.

Figure 10:
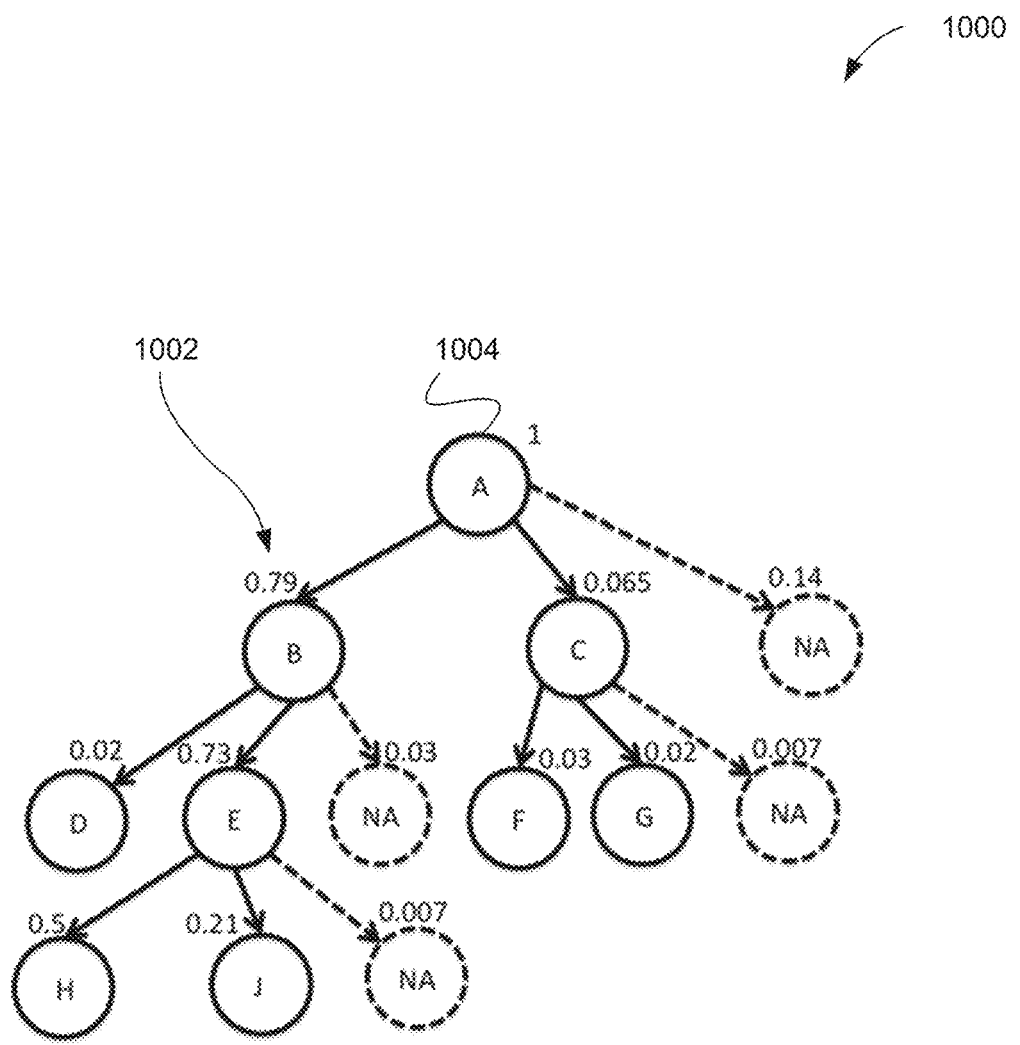
FIG. 10 illustrates a tree including calculated probabilities at each transition thereof, in accordance with one embodiment.

In order to delete (e.g. prune, etc.) unique (e.g. rare, etc.) sequences, a probability may be calculated at each transition. Since there are 183 sub-journeys, the probabilities may be calculated as shown in FIG. 10. FIG. 10 illustrates a tree 1000 including calculated probabilities 1002 at each transition thereof, in accordance with one embodiment. As shown, all of the journeys pass through a first node 1004 such that it has a probability of 1. Further, a sum of all final nodes (including NAs) is 1 (note that such probabilities are rounded)

In the context of the previous example, a threshold T2 may be considered. If the probability 1002 at any non-terminating node is below the threshold T2, such node may be deleted along with any children (if they exist). Further the count associated with such node (and any children) may be assigned to the terminating node of its parent.

Figure 11:
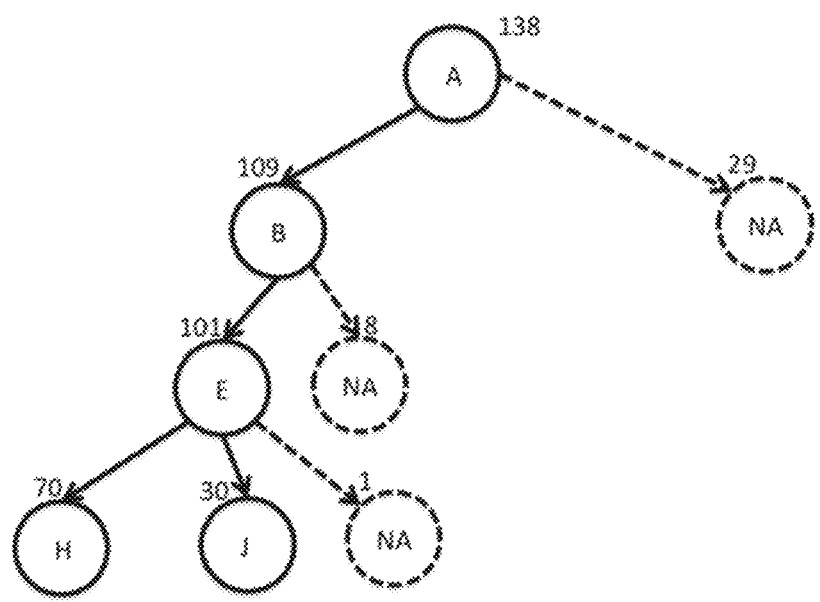
FIG. 11 illustrates a tree that has been the subject of pruning, in accordance with one embodiment.

FIG. 11 illustrates a tree 1100 that has been the subject of pruning, in accordance with one embodiment. As illustrated, considering threshold T2 to be 0.15, such would result in the deletion of nodes C and D. Further, the respective counts (3 and 9, as illustrated FIG. 11) are then assigned to terminating nodes of their parents (i.e. the terminating nodes of A and B, respectively). Thus, the altered tree shown in FIG. 11 (with new counts) results. It should be noted that there are now 5 unique sub-journeys (rather than 9) and that ratio R is reduced accordingly.

Yet another embodiment will now be described for optimizing the threshold T2, similar to the threshold optimization described in the context of previous embodiments. Here again, values of the threshold may be scanned from T2=0 to T2=1 to measure the resultant ratio R. Using the aforementioned elbow method, the optimal value of T2 may then be ascertained.

In one possible use case embodiment, any one or more of the aforementioned techniques may be employed in the area of cross channel analytics. In such embodiment, the events of the sub-journey may correspond to contacts between a subscriber and a telecommunication provider. Such contacts points may include calls to a call center, on-line visits, retail store visits, technician visits, online agent chats, etc. In this embodiment, the sub-journeys may be created such that a maximum time between any successive events is 7 days. Further, the set of sub-journeys so created is then simplified using the two step process described here, where the optimal values for T1 and T2 may be established using the above-mentioned elbow method.

Such embodiment may thus be used to create a succinct set of sub-journeys which represents a most common (and therefore more important) sequences of contacts between the customer and the telecommunication provider. For example, it may allow discovery of a particular sequence of events, whereby a customer receives a technician to their home, attempts to resolve some follow up issue online, but ultimately has to call a call center. By virtue of the application of one or more of the techniques described herein, more relevant events are detectable despite random occurrence of unrelated retail store visits and other 'out-of-sequence' events which would otherwise pollute the underlying patterns of events.

Figure 12:
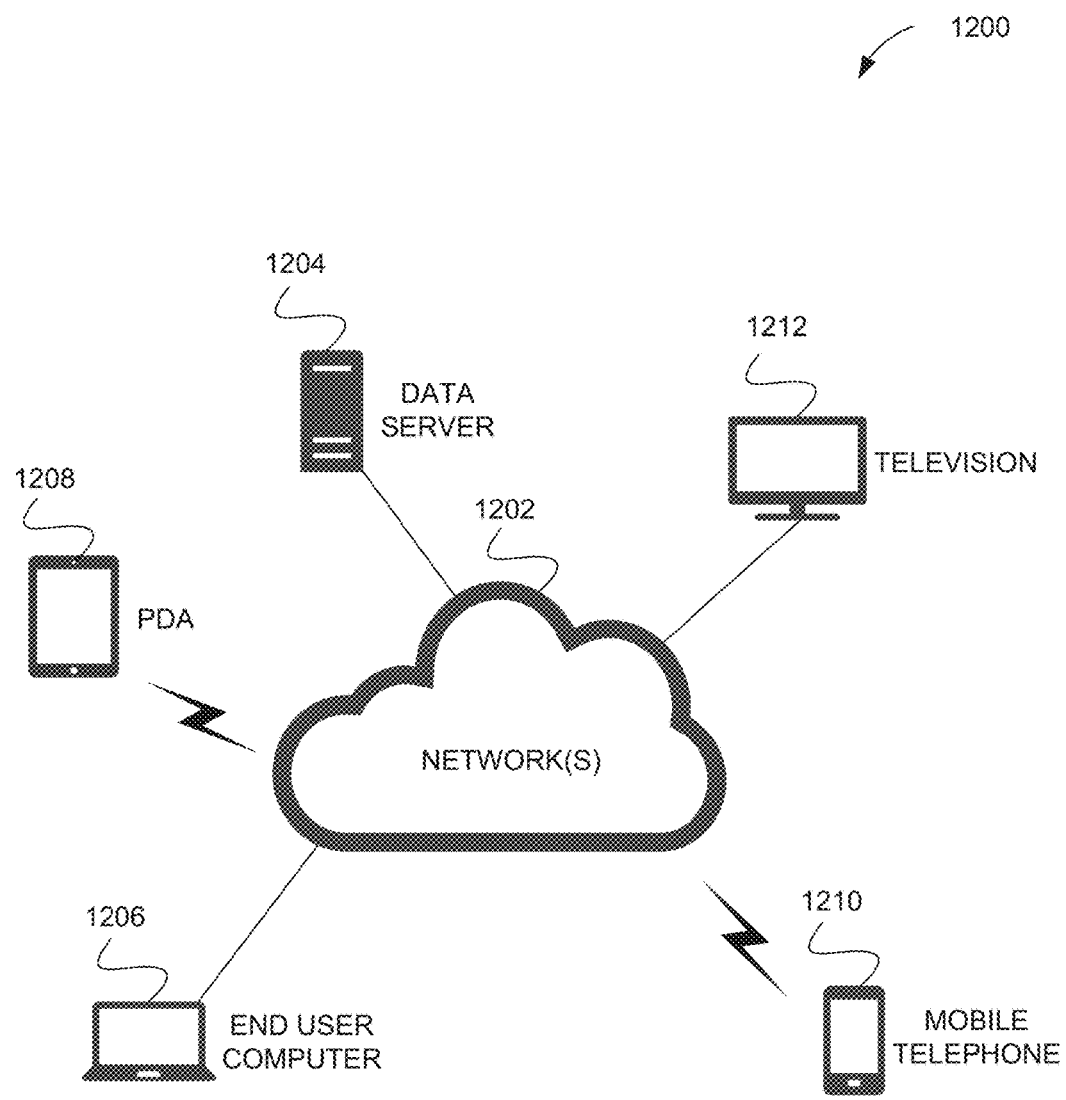
FIG. 12 illustrates a network architecture, in accordance with one possible embodiment.

FIG. 12 illustrates a network architecture 1200, in accordance with one possible embodiment. As shown, at least one network 1202 is provided. In the context of the present network architecture 1200, the network 1202 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 1202 may be provided.

Coupled to the network 1202 is a plurality of devices. For example, a server computer 1204 and an end user computer 1206 may be coupled to the network 1202 for communication purposes. Such end user computer 1206 may include a desktop computer, lap-top computer, and/or any other type of logic. Still yet, various other devices may be coupled to the network 1202 including a personal digital assistant (PDA) device 1208, a mobile phone device 1210, a television 1212, etc.

Figure 13:
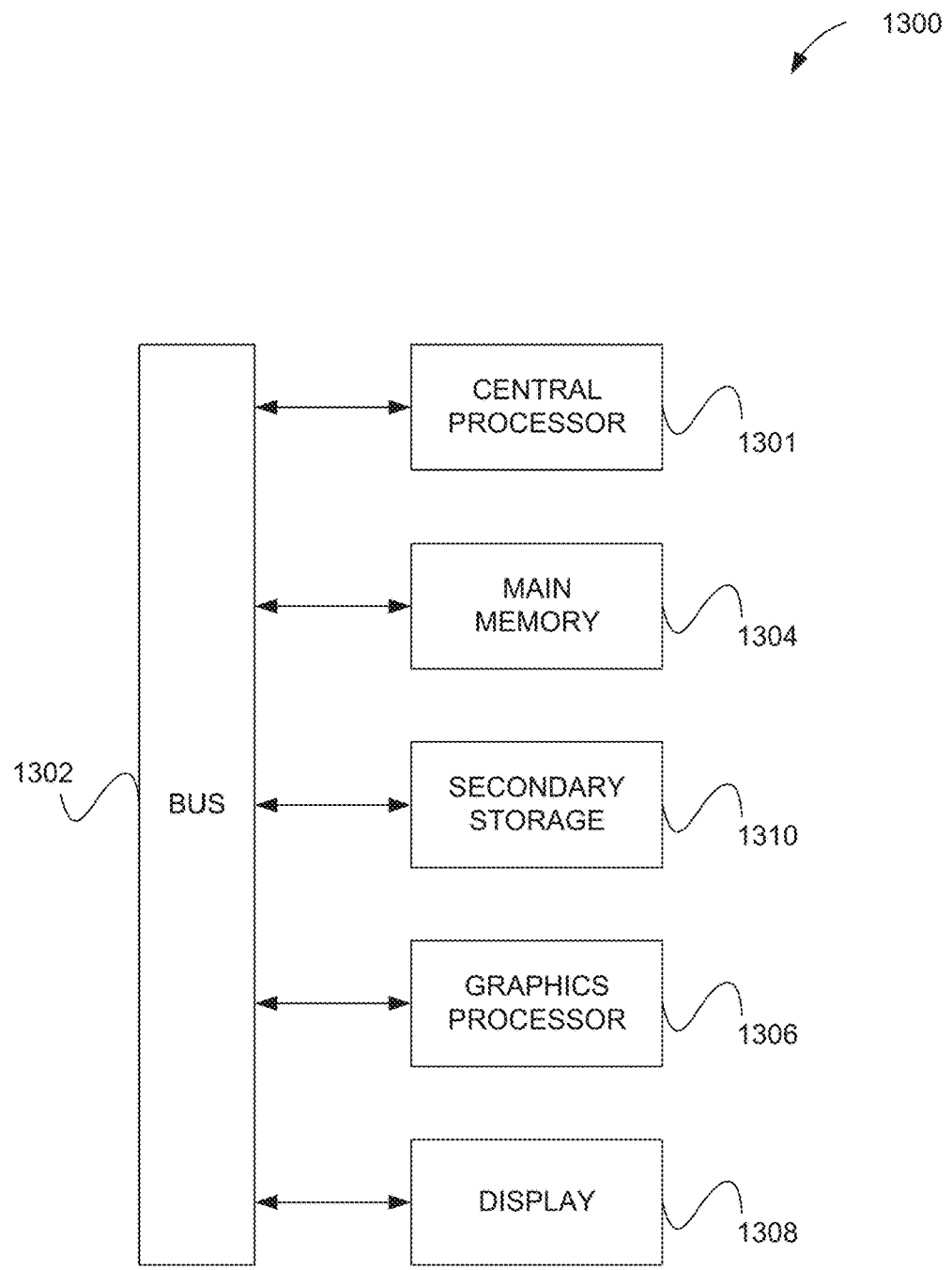
FIG. 13 illustrates an exemplary system, in accordance with one embodiment.

FIG. 13 illustrates an exemplary system 1300, in accordance with one embodiment. As an option, the system 1300 may be implemented in the context of any of the devices of the network architecture 1200 of FIG. 12. Of course, the system 1300 may be implemented in any desired environment.

As shown, a system 1300 is provided including at least one central processor 1301 which is connected to a communication bus 1302. The system 1300 also includes main memory 1304 [e.g. random access memory (RAM), etc.]. The system 1300 also includes a graphics processor 1306 and a display 1308.

The system 1300 may also include a secondary storage 1310. The secondary storage 1310 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 1304, the secondary storage 1310, and/or any other memory, for that matter. Such computer programs, when executed, enable the system 1300 to perform various functions (as set forth above, for example). Memory 1304, storage 1310 and/or any other storage are possible examples of non-transitory computer-readable media.

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that various of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. A computer program product embodied on a non-transitory computer readable medium, comprising computer code for:
   storing, in a database, a plurality of records for a plurality of customers, each record of the plurality of records storing an event sequence associated with a customer interactions that includes a plurality of events of different event types;
   receiving, via an input device, an indication of one or more aspects associated with one or more of the events for one or more of the customers;
   identifying, utilizing at least one processor, a plurality of sub-event sequences from one or more of the records, based on the indication;
   processing, utilizing the at least one processor, the plurality of sub-event sequences, the processing including:
      determining a count of unique sub-event sequences from the plurality of sub-event sequences,
      determining a ratio of the count of the unique sub-event sequences to a count of the plurality of sub-event sequences,
      determining that the ratio is below a predefined threshold,
      responsive to determining that the ratio is below the predefined threshold, reducing noise in the plurality of sub-event sequences by selectively removing events from the plurality of sub-event sequences to reduce the count of the unique sub-event sequences, and
      discovering, from the plurality of sub-event sequences having the reduced noise, a common sequence of events.

2. The computer program product of claim 1, wherein the events are collected from a plurality of different sources.

3. The computer program product of claim 1, wherein the indication of the one or more aspects includes an identification of the one or more events, or information associated with the one or more events.

4. The computer program product of claim 1, wherein the plurality of sub-event sequences are relevant to the one or more aspects.

5. The computer program product of claim 4, wherein plurality of sub-event sequences are determined relevant to the one or more aspects, based on at least one of: a time criteria, an event type criteria, a predetermined event criteria, or a plurality of rules.

6. The computer program product of claim 1, wherein a transition matrix is utilized for selectively removing events from the plurality of sub-event sequences.

7. The computer program product of claim 6, wherein the transition matrix includes counts of transitions between events of the sub-event sequences;
   converting the counts to probabilities;
   comparing the probabilities and a second threshold; and
   removing a portion of the events in the sub-event sequences that are unique, based on the comparison.

8. The computer program product of claim 1, wherein selectively removing events from the plurality of sub-event sequences to reduce the count of the unique sub-event sequences includes:
   identifying unique transitions between two events within the plurality of sub-event sequences, and
   removing a second event of the two events.

9. The computer program product of claim 1, wherein each event sequence in one of the records reflects the customer interactions to accomplish one or more goals, over a period of time, and wherein the plurality of sub-event sequences are processed to determine the common sequence of events associated with accomplishing a specific one of the one or more goals.

10. A method, comprising:
   storing, in a database, a plurality of records for a plurality of customers, each record of the plurality of records storing an event sequence associated with a customer interactions that includes a plurality of events of different event types;
   receiving, via an input device, an indication of one or more aspects associated with one or more of the events for one or more of the customers;
   identifying, utilizing at least one processor, a plurality of sub-event sequences from one or more of the records, based on the indication;
   processing, utilizing the at least one processor, the plurality of sub-event sequences, the processing including:
      determining a count of unique sub-event sequences from the plurality of sub-event sequences,
      determining a ratio of the count of the unique sub-event sequences to a count of the plurality of sub-event sequences,
      determining that the ratio is below a predefined threshold,
      responsive to determining that the ratio is below the predefined threshold, reducing noise in the plurality of sub-event sequences by selectively removing events from the plurality of sub-event sequences to reduce the count of the unique sub-event sequences, and
      discovering, from the plurality of sub-event sequences having the reduced noise, a common sequence of events.

11. A system, comprising:
   one or more hardware processors for:
   storing, in a database, a plurality of records for a plurality of customers, each record of the plurality of records storing an event sequence associated with customer interactions that includes a plurality of events of different event types;
   receiving, via an input device, an indication of one or more aspects associated with one or more of the events for one or more of the customers;
   identifying a plurality of sub-event sequences from one or more of the records, based on the indication;
   processing the plurality of sub-event sequences, the processing including:
      determining a count of unique sub-event sequences from the plurality of sub-event sequences, determining a ratio of the count of the unique sub-event sequences to a count of the plurality of sub-event sequences, determining that the ratio is below a predefined threshold, responsive to determining that the ratio is below the predefined threshold, reducing noise in the plurality of sub-event sequences by selectively removing events from the plurality of sub-event sequences to reduce the count of the unique sub-event sequences, and discovering, from the plurality of sub-event sequences having the reduced noise, a common sequence of events.

* * * * *